US011928823B2

United States Patent
Calvarese et al.

(10) Patent No.: US 11,928,823 B2
(45) Date of Patent: Mar. 12, 2024

(54) TRANSIENT SENSOR MONITORING DEFINITIONS FOR EDGE COMPUTING DEVICES

(71) Applicant: ZEBRA TECHNOLOGIES CORPORATION, Lincolnshire, IL (US)

(72) Inventors: Russell Calvarese, Stony Brook, NY (US); Sean Connolly, Stony Brook, NY (US); Michael B. Miller, Oakdale, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 448 days.

(21) Appl. No.: 17/356,459

(22) Filed: Jun. 23, 2021

(65) Prior Publication Data
US 2022/0414889 A1   Dec. 29, 2022

(51) Int. Cl.
*G06T 7/13*   (2017.01)
*G06T 7/00*   (2017.01)
*G06T 7/11*   (2017.01)

(52) U.S. Cl.
CPC .............. *G06T 7/13* (2017.01); *G06T 7/0004* (2013.01); *G06T 7/11* (2017.01)

(58) Field of Classification Search
CPC ..... G06T 7/00; G06T 7/13; G06T 7/11; G06T 2207/30232; H04N 7/18; H04N 21/42202
See application file for complete search history.

(56) References Cited

U.S. PATENT DOCUMENTS

| 9,015,072 | B2* | 4/2015 | Wu | G06Q 10/087 |
| | | | | 705/28 |
| 10,452,924 | B2* | 10/2019 | Adato | G08B 21/182 |
| 11,188,763 | B2* | 11/2021 | Krishnamurthy | G06T 7/292 |
| 11,423,354 | B2* | 8/2022 | Connolly | G06K 7/10722 |
| 11,450,011 | B2* | 9/2022 | Wang | G06Q 20/203 |
| 11,625,918 | B2* | 4/2023 | Krishnamurthy | G06V 10/764 |
| | | | | 382/103 |
| 11,628,001 | B2* | 4/2023 | Dean | A61B 17/8071 |
| | | | | 606/286 |

(Continued)

FOREIGN PATENT DOCUMENTS

WO   WO-2017180752 A1 *  10/2017 ............. G01B 21/20

OTHER PUBLICATIONS

Moorthy et al., 2015, "On-shelf availability in retailing" (pp. 47-51) (Year: 2015).*

*Primary Examiner* — Manav Seth

(57) ABSTRACT

A method in a server includes receiving sensor data from an edge computing device, the sensor data generated by a sensor array disposed on a support surface carrying items; detecting, from the sensor data, a set of regions of the sensor array corresponding to respective items carried on the support surface; generating, for each region, a corresponding monitoring definition, each monitoring definition containing: a location of the region within the array, a noise compensation indicator, and an item presence indicator; sending the monitoring definitions to the edge computing device; subsequent to sending the monitoring definitions, receiving item count data from the edge computing device, the item count data derived at the edge computing device from further sensor data generated by the sensor array, based on the monitoring definitions.

20 Claims, 6 Drawing Sheets

(56) References Cited

U.S. PATENT DOCUMENTS

| | | | |
|---|---|---|---|
| 11,756,211 B2* | 9/2023 | Krishnamurthy | G06V 20/653 |
| | | | 382/103 |
| 2015/0052029 A1* | 2/2015 | Wu | G06Q 10/087 |
| | | | 705/28 |
| 2015/0054959 A1* | 2/2015 | He | G06V 10/40 |
| | | | 348/150 |
| 2017/0032534 A1* | 2/2017 | Sullivan | G06T 7/74 |
| 2019/0311486 A1* | 10/2019 | Phan | G06T 7/50 |
| 2020/0193281 A1* | 6/2020 | Wilfred | G06K 17/0022 |
| 2021/0124947 A1* | 4/2021 | Datar | G06V 10/764 |
| 2022/0137256 A1* | 5/2022 | Huang | G01V 8/10 |
| | | | 702/150 |
| 2022/0230216 A1* | 7/2022 | Buibas | G06V 10/454 |
| 2022/0414889 A1* | 12/2022 | Calvarese | G06T 7/11 |
| 2023/0300583 A1* | 9/2023 | Calvarese | H04W 76/10 |
| | | | 455/41.2 |

* cited by examiner

TRANSIENT SENSOR MONITORING DEFINITIONS FOR EDGE COMPUTING DEVICES

BACKGROUND

Environments such as retail facilities, manufacturing facilities, transport and logistics facilities, and the like, may handle a wide variety of materials. Monitoring such materials may be achieved by deploying sensors of various types in the facilities, and processing data collected by the sensors, e.g. to detect the presence and/or movement of items, item types, or the like. Making such detections, however, may involve processing large volumes of the sensor data, which may impact the performance of onsite communications networks, as well as servers or other computing devices tasked with processing the data.

In some deployments, the load imposed on communications networks and backend computing resources may be reduced by the deployment of edge computing devices, which may be comparatively simple, low-power devices that can be deployed throughout a facility to perform certain processing instead of the above-mentioned backend resources. Some tasks, however, may be too computationally demanding for edge computing devices.

SUMMARY

In an embodiment, the present invention is a method in a server, the method comprising: receiving sensor data from an edge computing device, the sensor data generated by a sensor array disposed on a support surface carrying items; detecting, from the sensor data, a set of regions of the sensor array corresponding to respective items carried on the support surface; generating, for each region, a corresponding monitoring definition, each monitoring definition containing: a location of the region within the array, a noise compensation indicator, and an item presence indicator; sending the monitoring definitions to the edge computing device; subsequent to sending the monitoring definitions, receiving item count data from the edge computing device, the item count data derived at the edge computing device from further sensor data generated by the sensor array, based on the monitoring definitions.

In another embodiment, the present invention is a method in an edge computing device, the method comprising: collecting sensor data from a sensor array disposed on a support surface carrying items; transmitting the sensor data to a server; receiving, from the server, a set of monitoring definitions derived from the sensor data, each monitoring definition containing: a location of a region within the array, a noise compensation indicator for the region, and an item presence indicator for the region; collecting further sensor data from the sensor array; based on the further sensor data and the monitoring definitions, assessing each of the regions to determine whether the region contains an item; and transmitting item count data to the server based on the region assessments.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
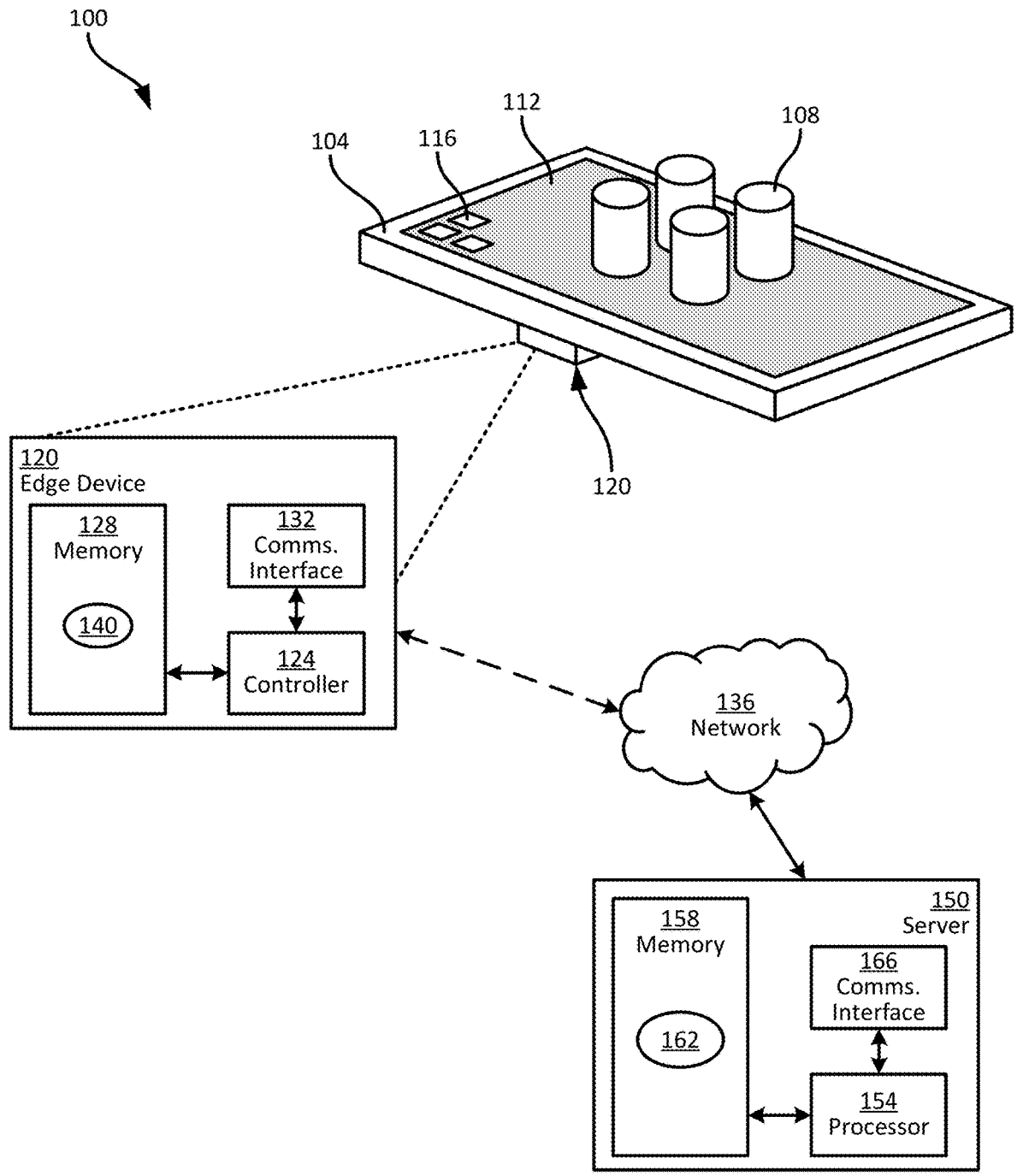
FIG. 1 is a diagram of a system for inventory monitoring.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 illustrates a system 100 for inventory monitoring, which can be deployed in a retail facility or the like. The facility can include, as in the illustrated example, a support surface 104 of a shelf, table, or other support structure. The support surface 104 is configured to support a plurality of items 108 thereon (four of which are shown in FIG. 1 for illustrative purposes), e.g. grocery items or other consumer goods. As will be apparent, the support surface 104 may be placed in a portion of the facility accessible to customers, who may travel through the facility and remove certain items 108 from the support surface 104 for purchase. As will be apparent, the facility can include a number of distinct support surfaces, e.g. arranged into shelving units organized in aisles or other suitable configurations. A single support surface 104 is shown in FIG. 1 for simplicity of illustration.

The system 100 enables monitoring of the support surface 104 to determine a number of the items 108 currently present on the support surface 104. Various actions can be taken in response to detecting changes in a number of items 108 on the support surface 104. For example, a "sweep" event may be characterized as the removal of a substantial portion of the items 108 from the support surface 104 over a short time period (e.g. removal of all items 108 present within a period of five seconds). Detection of a sweep event may be used to generate a notification to loss prevention staff or the like. Various other control actions will also occur to those skilled in the art as being enabled by item count monitoring, including triggering restocking notifications, and the like.

To detect a number of the items 108 on the support surface 104, the system 100 includes a sensor array 112, which in the present example is implemented as a pressure-sensitive mat. The sensor array 112 thus includes a plurality of pressure-sensitive elements 116, such as force-sensitive resistors (FSR), three examples of which are illustrated. The elements 116 can be arranged in a grid, such that the sensor array 112 produces a set of pressure measurements corresponding to respective positions in the grid. The pressure measurements can therefore be represented in an image, with each pixel containing a value indicating a pressure measurement. As will be apparent, the size of the three example elements 116 is exaggerated for illustrative purposes, and the sensor array 112 can include smaller and more closely spaced elements 116 in other examples. For example, one sensor array 112 can include several thousand elements (e.g. a grid of 280 by 120 elements 116).

The sensor array 112 is connected to an edge computing device 120, which is mounted on the support surface 104 itself or another nearby surface, sufficiently close physically to the sensor array 112 to be connected with the sensor array 112 via one or more connectors. The edge device 120 can include a system-on-chip (SoC) or other suitable architecture including a controller 124, a non-transitory storage device such as a memory 128 (e.g. a suitable combination of volatile and non-volatile storage elements), and a communications interface 132. The communications interface 132 can be, for example, a wireless interface such as a Bluetooth Low Energy (BLE) configured to receive and transmit data via a network 136. The network 136 can implement a plurality of communication standards, e.g. BLE to enable communication with the edge device 120, as well as Ethernet or other suitable standards to enable communication with other computing devices of the system 100, to be described in greater detail below.

The memory 128 of the edge device 120 stores computer-readable instructions 140 (which may also be referred to as an application 140), executable by the controller 124 to perform certain functionality related to the collection and processing of sensor data from the sensor array 112. Execution of the application 140 enables the controller 124 to perform relatively simple processing of the sensor data, as well as transmission of the sensor data to other computing devices, such as a server 150 connected to the network 136. However, the computational resources of the controller 124 and/or the capacity of the memory 128 may limit the speed with which more complex processing of the sensor data can be performed, or prevent such processing entirely. Examples of such processing include noise filtering and object detection (e.g. via blob detection algorithms or the like) that are necessary to determine which regions of the sensor array 112 correspond to portions of the support surface 104 carrying items 108.

The server 150, in contrast, has sufficient computational resources to perform such processing. However, the capacity of the communications interface 132 to transmit data may be limited, such that transmitting a full frame of sensor data (e.g. a pressure measurement for each element 116, for example in the form a grayscale image or the like) may consume a period of time greater than the desired frequency at which the system 100 is intended to update item counts. For example, the transmission of one frame of sensor data via the communications interface 132 may consume an hour, while the desired item count update frequency may be between one and five seconds.

In other words, the task of periodically determining a number of items 108 on the support surface 104 is complicated by both the limited local capabilities of the edge device 120, and the limited speed with which the edge device 120 can transmit data to the server 150 for processing.

To that end, the edge device 120 and the server 150 implement functionality enabling the server 150 to not only process sensor data to detect items 108 therein, but also generate monitoring definitions for use by the edge device 120 to perform simplified item counting locally, without the use of noise filtering and/or object detection mechanisms as mentioned above (and as employed by the server 150). The monitoring definitions are transient, in that following a sufficient change in the state of the support surface 104 (e.g. a restocking of the items 108), the monitoring definitions may no longer produce accurate item counts. However, the monitoring definitions enable the edge device 120 to produce item counts independently, at a desired frequency, for at least a sufficient period of time to allow transmission of updated sensor data to the server 150. The server 150 can then process the updated sensor data to generate updated monitoring definitions.

The server 150 includes a processor 154 (e.g., a central processing unit (CPU) and/or graphics processing unit (GPU)), interconnected with a non-transitory computer readable storage medium, such as a memory 158. The memory 158 includes a combination of volatile memory (e.g., Random Access Memory or RAM) and non-volatile memory (e.g., read only memory or ROM, Electrically Erasable Programmable Read Only Memory or EEPROM, flash memory). The processor 154 and the memory 158 each comprise one or more integrated circuits. The memory 158 stores computer readable instructions executable by the processor 154 to perform the item detection and label control functions mentioned above. In particular, the memory 158 stores an item detection and monitoring definition generation application 162 executable by the processor 154 to perform various actions discussed herein.

The server 150 also includes a communications interface 166 interconnected with the processor 154. The communications interface 166 includes suitable hardware (e.g., transmitters, receivers, network interface controllers and the like) allowing the server 150 to communicate with other devices in the system, including the edge device 120.

Figure 2:
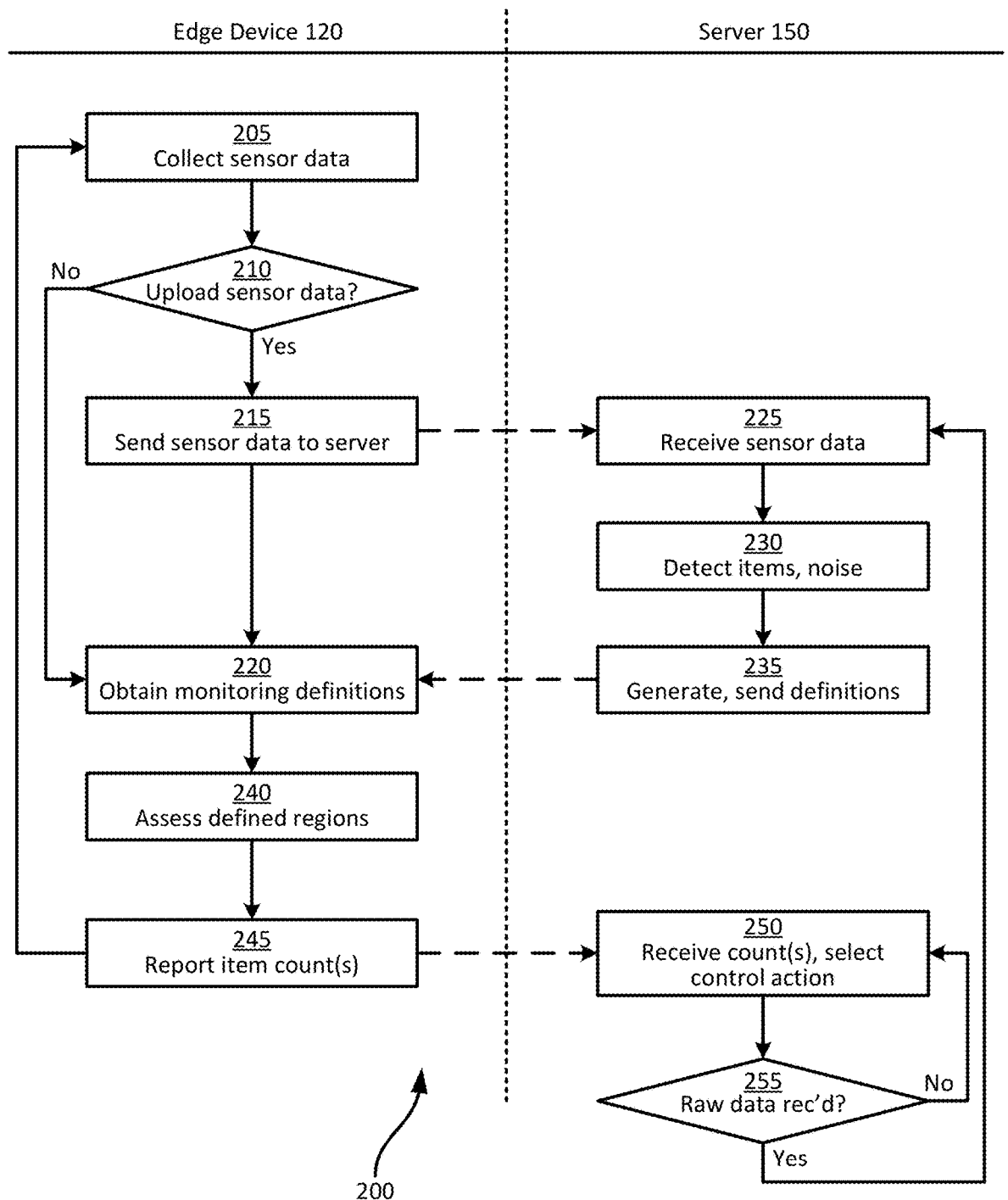
FIG. 2 is a flowchart of a method of inventory monitoring.

Turning to FIG. 2, a method 200 of monitoring item counts via the above-mentioned monitoring definitions is illustrated. As indicated in FIG. 2, certain blocks of the method 200 are performed by the edge device 120, while other blocks are performed by the server 150.

At block 205, the edge device 120 is configured to collect sensor data from the sensor array 112. For example, the edge device 120 can be configured to obtain an array of pressure measurements from the sensor array 112 at a predetermined frequency (e.g. every two seconds). In the present example, the pressure measurements are obtained in the form of an image, with each pixel containing a pressure measurement. In addition, the pressure measurements may be generated collected as binary measurements by the sensor array 112 itself, or converted to binary measurements upon collection. For example each element 116 can be configured to generate a first signal if the pressure on the element 116 exceeds a threshold, and to generate a second signal if the pressure on the element 116 does not exceed the threshold. As a result, the sensor data collected at block 205 can include a binary image with dimensions (in pixels) defined by the number of elements 116 in the sensor array 112. In other examples, the pressure measurements are not binarized, but instead defined as values between a lower bound (e.g. zero, representing no detected pressure) and an upper bound (e.g. 256, representing a maximum detectable pressure). The image, in other words, can be a grayscale image instead of a binary image.

Figure 3:
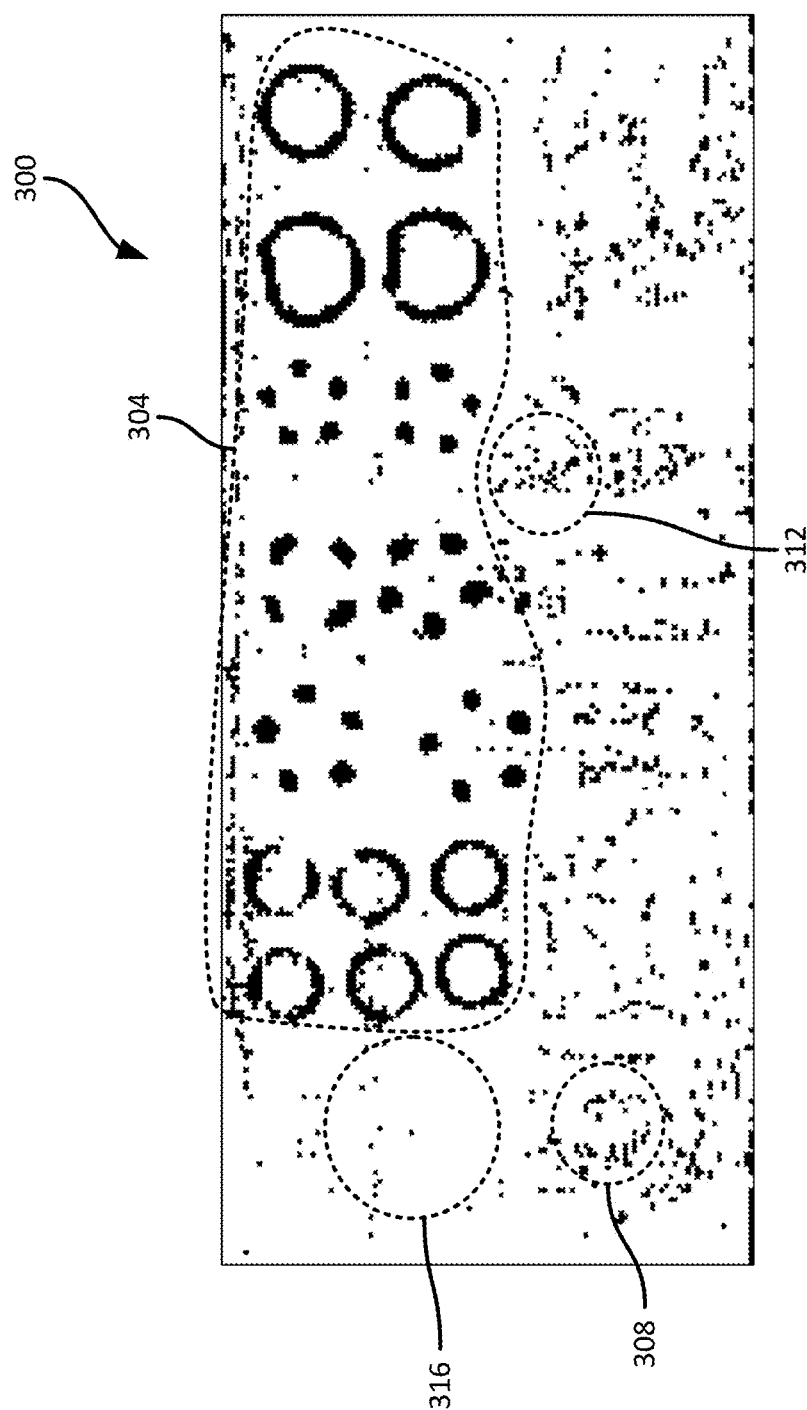
FIG. 3 is a diagram illustrating sensor data captured in the method of FIG. 2.

Turning to FIG. 3, example sensor data 300 is illustrated as collected at block 205. The black pixels, (also referred to as active) are those indicating the presence of sufficient pressure to exceed the above-mentioned threshold, while the white pixels (also referred to as inactive) indicate insufficient pressure to exceed the threshold. As seen in FIG. 3, the sensor data 300 reveals the presence of sixteen items 108 (contained in the dashed area 304). However, the detection of the items 108 is complicated by various factors. For example, some areas in the sensor data 300, such as the areas 308 and 312, include a substantial number of active pixels despite there being no item on the support surface 104 at that location. The area 308, for instance, may include noise in the form of a large number of active pixels because elements 116 of the sensor array 112 have greater sensitivity when adjacent areas (e.g. adjacent columns in the grid of elements 116) do not have items 108 thereon. The area 312, as another example, may present a number of active pixels due to mechanical deformations in the sensor array 112. Other areas, such as the area 316, also do not indicate the presence of an item 108, but contain few active pixels. The number of pixels alone in an area, in other words, may not accurately indicate whether an item is present in that area. More generally, the sensor data 300 may include various areas of noise and/or other artifacts, which can change over time as well as over the full area of the sensor array 112.

Returning to FIG. 2, at block 210 the edge device 120 is configured to determine whether to upload the sensor data 300 to the server 150, via the communications interface 132. In the present example, the determination at block 210 can be based on a stored schedule, e.g. indicating that sensor data is to be uploaded to the server 150 once per day. Therefore, the edge device 120 can store the previous time sensor data was sent to the server 150, and determine whether more than one day has elapsed since that time. Various other criteria can be applied at block 210, as will be discussed further below.

When the determination at block 210 is affirmative, at block 215 the edge device 120 is configured to transmit the sensor data to the server 150. In particular, one frame of sensor data (e.g. the image shown in FIG. 3) is transmitted to the server 150. As noted earlier, the transmission capabilities of the edge device 120 may be limited, and the transmission at block 215 may therefore consume a period of time greater than the desired frequency of item count monitoring. Therefore, as will be described below in greater detail, after initiating transmission of the sensor data (but before completion of such transmission), or after a negative determination at block 210, the edge device 120 proceeds to block 220, to obtain and use monitoring definitions for use in determining item counts locally (i.e. without the assistance of the server 150). Generation of the monitoring definitions at the server 150 is described below.

At block 225, the server 150 is configured to receive the sensor data transmitted by the edge device at block 215. As will be apparent, the sensor data referred to is the raw sensor data (e.g. as shown in FIG. 3), and not item counts or other information derived from the raw sensor data. At block 230, the server 150 is configured to process the received sensor data to detect items 108 therein. More specifically, the server 150 is configured to identify regions within the sensor data that indicate the presence of items 108 on the support surface 104, as a result of the pressure applied to the sensor array 112 by the items 108. The detection of regions containing items 108 can include any suitable one of, or any suitable combination of, image processing mechanisms, including blob detection algorithms, machine-learning based algorithms, and the like. Such processing mechanisms are selected and configured to distinguish between active pixels in the sensor data that represent items 108, and active pixels in the sensor data that represent noise or other artifacts. As will be apparent to those skilled in the art, the processing mechanisms employed to detect items 108 in the sensor data at block 230 may sufficiently complex that the edge device 120 either cannot implement such mechanisms, or cannot perform such mechanisms quickly enough to meet the desired item count update frequency.

Figure 4:
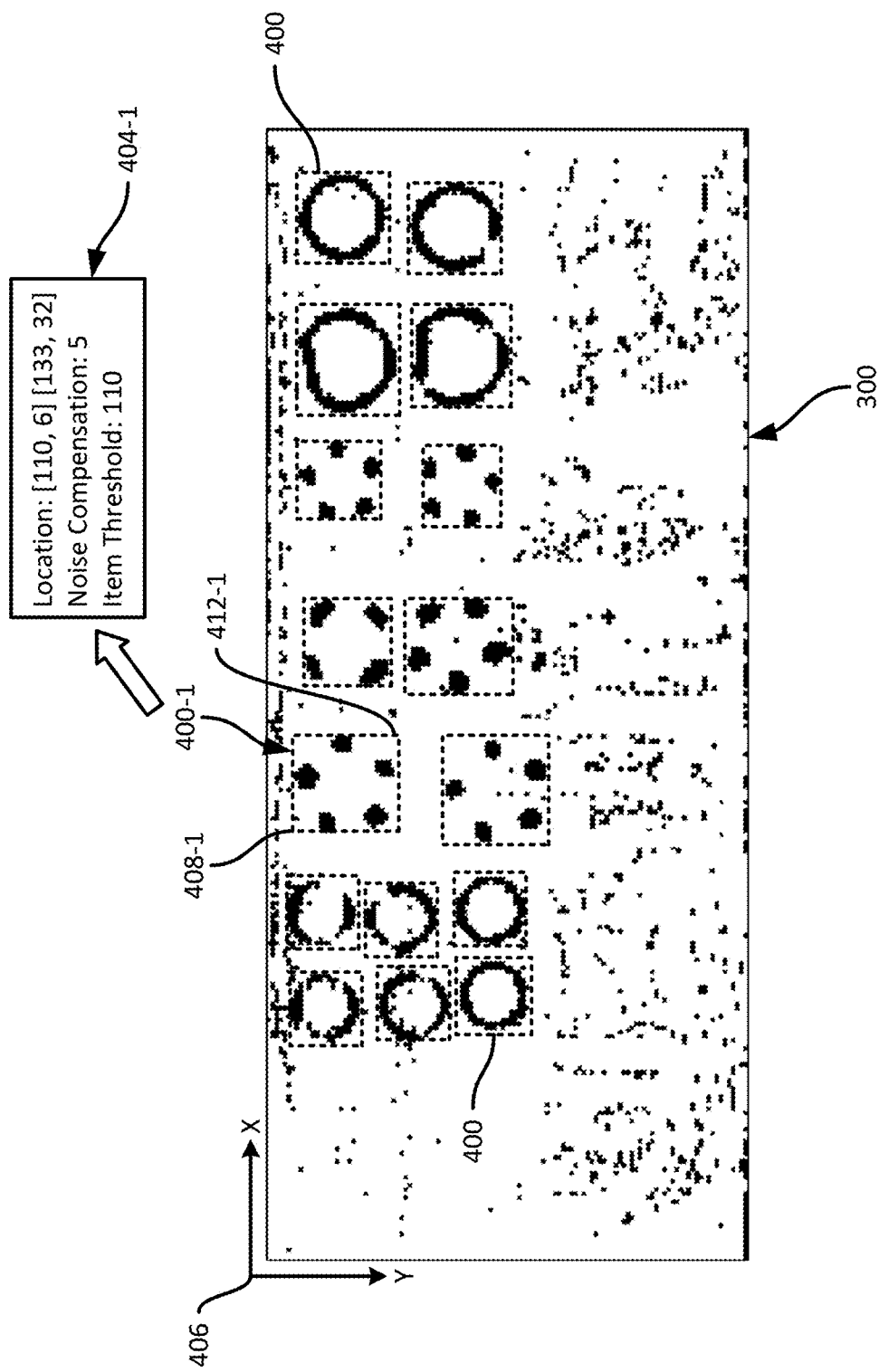
FIG. 4 is a diagram illustrating monitoring definitions generated from the sensor data of FIG. 3.

As a result of the item detection at block 230, the server 150 identifies a set of regions in the sensor data 300, each region corresponding to one item 108. FIG. 4 illustrates the sensor data 300, overlaid with sixteen such regions 400, shown in dashed lines. Each region 400 is defined as a rectangular bounding box. As will be apparent, the regions 400 are not consistently sized, as a result of differing item sizes, sensor noise, and other artifacts in the sensor data 300. Therefore, the total number of pixels in each region 400 varies between regions 400. In addition, each region 400 contains a different proportion of active pixels that represent the corresponding item 108, and active pixels that represent sensor noise. The server 150 is configured, during item detection, to not only define the boundaries of the regions 400, but also to determine which active pixels in each region are inliers (i.e. representing the item 108 in that region 400), and which active pixels are outliers (i.e. representing noise).

Referring briefly to FIG. 2, at block 235 the server 150 is configured to generate a set of monitoring definitions from the item detections at block 230. The server 150 generates one monitoring definition for each region 400. The monitoring definitions are then sent to the edge device 120, and are used by the edge device 120 to determine whether each region 400 still contains an item 108, or whether the item 108 has been removed. In other words, the monitoring definitions enable the edge device 120 to perform a computationally simple process (in comparison to the image processing mechanisms employed by the server 150 to identify the items 108) to detect changes in item presence on the support surface 104.

Returning to FIG. 4, a specific region 400-1 will be discussed below in greater detail to illustrate the characteristics of the regions 400 and resulting monitoring definitions. Specifically, an example monitoring definition 404-1 generated based on the region 400-1 is illustrated. The monitoring definition 404-1 contains a location of the region 400-1 within the sensor array 112. In this example, the location is defined as pairs of coordinates, in a coordinate system 406 corresponding to the sensor data 300, for at least two corners of the region 400-1. The monitoring definition 404-1 contains coordinates of the top-left corner 408-1 and the bottom-right corner 412-1 of the region 400-1 in the illustrated example. In other examples, however, the monitoring definition 404-1 can contain coordinates for all four corners of the region 400-1, or a different pair of opposing corners, or the like. More generally, the location in the monitoring definition contains sufficient information to enable the edge device 120 to identify the region 400-1. In other implementations, for instance, the location can define coordinates of a predefined corner, as well as a length and width of the region 400-1.

The monitoring definition 404-1 also includes a noise compensation indicator. As noted above, the proportion of active pixels in each region 400 that represent noise (rather than an item 108) may vary between regions. The noise compensation indicator is a count of the number of active pixels in the region 400-1 that were categorized as noise or other outliers, rather than inliers indicating the presence of an item 108. The noise compensation indicator, in other words, defines a noise floor specific to the region 400-1, for later use by the edge device 120.

The monitoring definition also includes an item presence indicator. In this example, the item presence indicator is a threshold number of active pixels, selected based on the number of active inlier pixels detected in the region 400-1 by the server 150. A number of active pixels exceeding the item presence indicator, after noise pixels are discounted, indicates the continued presence of an item 108 in the region 400-1. A number of active pixels below the item presence indicator, however, indicates that an item 108 is no longer present in the region 400-1.

In some examples, each monitoring definition can also include a region identifier distinguishing the region 400 from the regions defined by the remaining monitoring definitions. The region identifier may be omitted, however.

Returning to FIG. 2, having generated the monitoring definitions at block 235, the server 150 transmits the monitoring definitions to the edge device 120 via the network 136. Each monitoring definition contains, as noted above, a small number of numerical values, and a set of monitoring definitions therefore consumes a smaller volume of data than the sensor data 300 itself. The time required for the edge device 120 to receive the monitoring definitions is therefore shorter than the time required to transmit the sensor data at block 215. Further, the monitoring definitions can be readily accommodated by the potentially limited storage capabilities of the memory 128. Various formats can be used to provide the monitoring definitions to the edge device 120. For example, the server 150 can generate a look-up table containing the monitoring definitions (e.g. with one row for each definition).

At block 220, the edge device 120 is configured to obtain the monitoring definitions, to assess the sensor data. Obtaining the monitoring definitions can include receiving and storing the monitoring definitions from the server 150, or retrieving previously stored monitoring definitions from the memory 128. As will be apparent, any given set of monitoring definitions received at the edge device 120 can be stored and used to process sensor data for a period of time before the next set of monitoring definitions are received (replacing the previous set in the memory 128). That is, the edge device 120 may most frequently perform block 220 by retrieving monitoring definitions from the memory 128, and only periodically receive new monitoring definitions.

At block 240, having obtained the monitoring definitions, the edge device 120 is configured to assess sensor data according to the monitoring definitions. In particular, the edge device 120 is configured to select only the regions of the sensor data indicated in the monitoring definitions, thus reducing the volume of data to be processed. Each selected region of sensor data is processed according to the noise compensation indicator and the item presence indicator in the corresponding monitoring definition.

Figure 5:
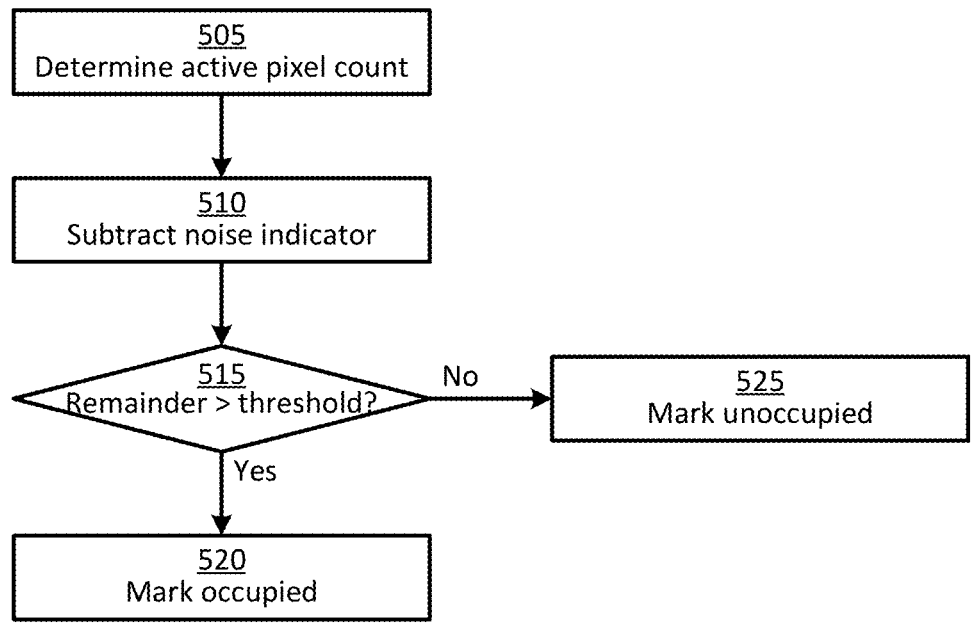
FIG. 5 is a flowchart of a method of assessing sensor data.

Turning to FIG. 5, a method 500 of performing the assessment at block 240 at the edge device 120 is illustrated. The method 500 is repeated for each monitoring definition obtained at block 220. At block 505, the edge device 120 is configured to determine an active pixel count for the region. As noted above, active pixels correspond to elements 116 detecting at least a threshold pressure level, whether from pressure exerted by an item 108, from a mechanical deformation of the sensor array 112, or the like. The determination at block 505 therefore involves identifying how many of the elements 116 within the region 400 generated signals greater than the above-mentioned threshold.

At block 510, the edge device 120 is configured to subtract, from the total number of active pixels in the region 400, the noise compensation indicator from the monitoring definition. Following the subtraction at block 510, the edge device 120 is configured at block 515 to determine whether the remaining count of active pixels in the region 400 exceeds the item presence indicator. When the determination at block 515 is affirmative, the region 400 is marked as containing an item 108 (i.e. as being occupied) at block 520. Otherwise, the region 400 is marked as being unoccupied, indicating that the item 108 detected in earlier sensor data by the server 150 is no longer present.

The edge device 120 is configured to perform the above assessment for each region 400 indicated by a monitoring definition. At block 245 of the method 200, the edge device 120 is configured to transmit item count data to the server 150. In some examples, the item count data includes a count of the number of regions 400 marked as occupied via block 520. In other examples, the item count data can include binary indications, for each region 400 (e.g. along with region identifiers), indicating whether or not an item 108 is present in each region 400. Following block 245, the edge device 120 returns to block 205 to collect further sensor data.

Of particular note, the edge device 120 is not required to perform item detection via the method 500. That is, the edge device 120 need not detect contiguous areas of active pixels or determine whether such contiguous areas represent items 108. Instead, the edge device 120 need only count active pixels within the regions 400. Thus, the removal of items 108 detected by the server 150 from previous sensor data can be detected at little computational cost by the edge device 120.

Figure 6:
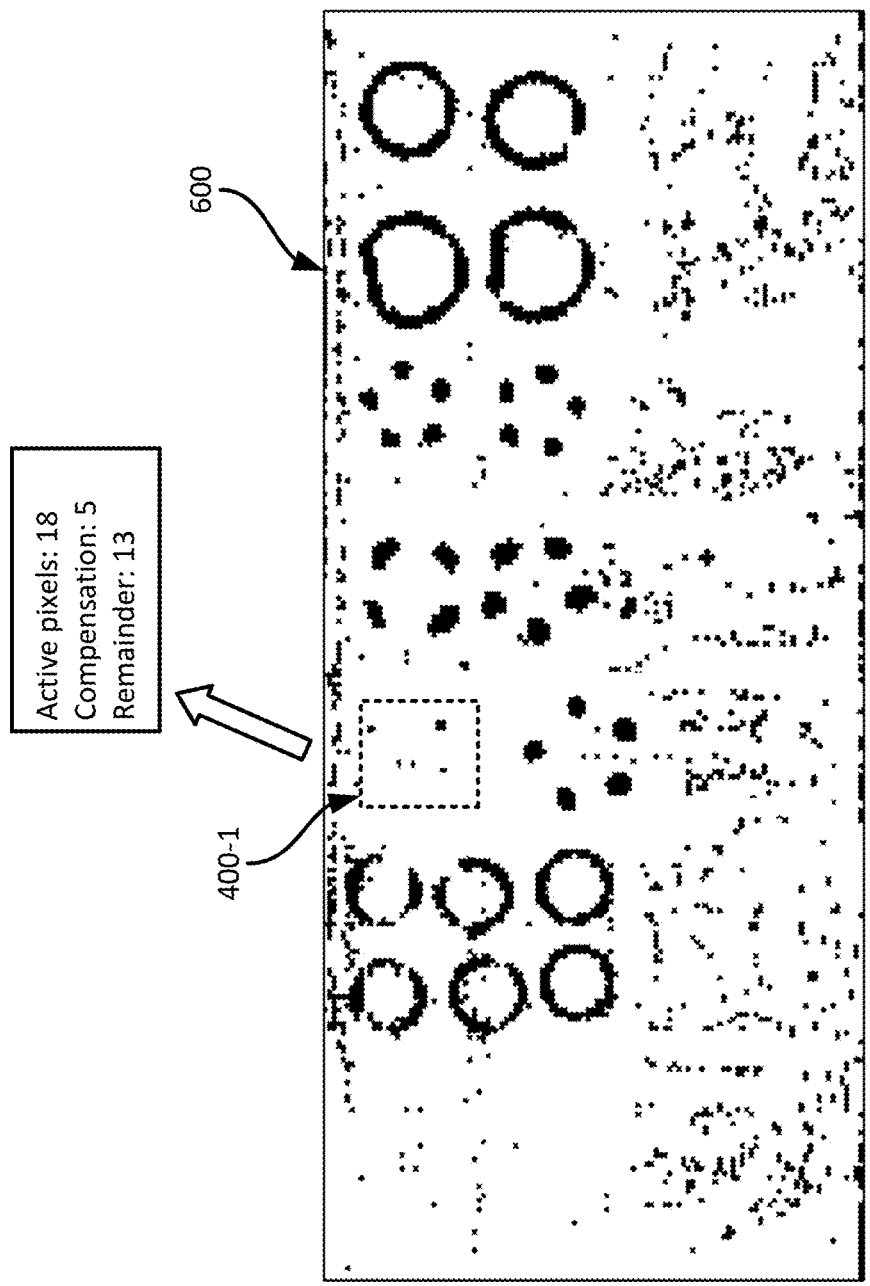
FIG. 6 is a diagram illustrating further sensor data captured in the method of FIG. 2.

Turning to FIG. 6, an example of updated sensor data 600, captured after the sensor data 300, is shown. The region 400-1 can be processed at block 240. In contrast with the sensor data 300, it can be seen that there is no longer an item 108 within the region 400-1. The monitoring definition 404-1 enables the edge device 120 to detect the absence of the item 108 by counting the number of active pixels in the region 400-1 (e.g. 18), and subtracting the noise compensation value (e.g. 5). The remainder of 13 pixels is below the item presence threshold in the definition 404-1, and the determination at block 515 is therefore negative. The edge device 120, in other words, detects a change in occupancy of the support surface 104 while avoiding the computational cost of item detection mechanisms such as those employed by the server 150.

The server 150, upon receiving the item count data at block 250, can select one or more control actions based on the item count data. For example, the server 150 can generate notifications to other computing devices to initiate a restock event, to notify loss prevention staff of a sweep event, or the like. The server 150 can track item counts on the support surface 104 over time, and can therefore be configured to select control actions based on a rate of change of the number of items 108 on the support surface 104, or other suitable criteria.

Following block 250, the server 150 is configured to determine whether the transmission of additional raw data has been initiated by the edge device 120. When the determination at block 255 is negative, the server 150 need not repeat blocks 225-235, and can instead continue collecting item count data from the edge device 120. When the determination at block 255 is affirmative, the server 150 performs blocks 225-235 to generate updated monitoring definitions. As will therefore be apparent, until new sensor data is received, the server 150 can continue to receive updated item count data from the edge device 120, independently of sensor data. Similarly, the edge device 120 can continue to generate item count data, independently of further instructions from the server 150, using the monitoring definitions from block 220.

As will be apparent, the monitoring definitions are transient because changes to the state of the support surface 104 render the monitoring definitions less accurate. For example, the removal of a sufficient number of items 108 from one portion of the support surface 104 may lead to an increase in sensitivity to another area of the sensor array 112. If the monitoring definitions are not updated, the edge device 120 may therefore begin making false positive detections in regions 400 where other items 108 had in fact been removed. Either or both of the edge device 120 and the server 150 can therefore initiate the provision of updated sensor data according to various criteria.

As noted above, the edge device 120 can be configured to send sensor data at block 215 according to a predetermined schedule, e.g. daily. Additionally, the edge device 120 can be configured to begin sending updated sensor data when an item count for the support surface has decreased by at least a threshold. In other examples, the server 150 can instruct the edge device 120 (e.g. at block 250) to begin sending updated sensor data using a similar determination. In still other examples, the edge device 120 can continuously send sensor data to the server 150, e.g. sending sensor data for only a predefined portion of the sensor array 112 at a given time. The server 150, in turn, can generate updated monitoring definitions for each portion of the sensor data separately.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method in a server, the method comprising:
receiving sensor data from an edge computing device, the sensor data generated by a sensor array disposed on a support surface carrying items;
detecting, from the sensor data, a set of regions of the sensor array corresponding to respective items carried on the support surface;
generating, for each region, a corresponding monitoring definition, each monitoring definition containing:
a location of the region within the array,
a noise compensation indicator, and
an item presence indicator;
sending the monitoring definitions to the edge computing device;
subsequent to sending the monitoring definitions, receiving item count data from the edge computing device, the item count data derived at the edge computing device from further sensor data generated by the sensor array, based on the monitoring definitions.

2. The method of claim 1, wherein the sensor array includes a pressure mat; and wherein the sensor data includes an image containing pixels representing pressure measurements.

3. The method of claim 2, wherein the location of the region includes a set of image coordinates.

4. The method of claim 3, wherein the set of image coordinates defines a bounding box containing a group of pixels representative of an item.

5. The method of claim 2, wherein generating the monitoring definitions includes identifying a number of pixels in each region that represent sensor noise, and setting the noise compensation indicator to the number of pixels that represent sensor noise.

6. The method of claim 2, wherein generating the monitoring definitions includes determining a lower threshold number of pixels indicating presence of an item, and setting the item presence indicator to the lower threshold.

7. The method of claim 1, wherein receiving the item count data includes receiving the item count data independent of further sensor data.

8. The method of claim 1, further comprising:
receiving updated sensor data;
generating updated monitoring definitions; and
sending the updated monitoring definitions to the edge device to replace the monitoring definitions.

9. A method in an edge computing device, the method comprising:
collecting sensor data from a sensor array disposed on a support surface carrying items;
transmitting the sensor data to a server;
receiving, from the server, a set of monitoring definitions derived from the sensor data, each monitoring definition containing:
a location of a region within the array,
a noise compensation indicator for the region, and
an item presence indicator for the region;
collecting further sensor data from the sensor array;
based on the further sensor data and the monitoring definitions, assessing each of the regions to determine whether the region contains an item; and
transmitting item count data to the server based on the region assessments.

10. The method of claim 9, wherein the sensor array includes a pressure mat; and wherein the sensor data includes an image containing pixels representing pressure measurements.

11. The method of claim 10, wherein the assessing includes, for each region:
determining a total count of active pixels in the region;
subtracting the noise compensation indicator from the total count; and
determining whether a remainder resulting from the subtraction exceeds the item presence indicator.

12. The method of claim 11, further comprising:
when the remainder exceeds the item presence indicator, determining that the region contains an item; and
when the remainder does not exceed the item presence indicator, determining that the region is unoccupied.

13. The method of claim 9, wherein the item count data includes a count of the regions containing items, according to the assessment.

14. The method of claim 9, wherein the item count data includes, for each region, a region identifier and an indicator of whether an item is present.

15. A server, comprising:
a communications interface;
a memory; and
a processor configured to:
receive sensor data from an edge computing device, the sensor data generated by a sensor array disposed on a support surface carrying items;

detect, from the sensor data, a set of regions of the sensor array corresponding to respective items carried on the support surface;

generate, for each region, a corresponding monitoring definition, each monitoring definition containing:
- a location of the region within the array,
- a noise compensation indicator, and
- an item presence indicator;

send the monitoring definitions to the edge computing device;

subsequent to sending the monitoring definitions, receive item count data from the edge computing device, the item count data derived at the edge computing device from further sensor data generated by the sensor array, based on the monitoring definitions.

16. The server of claim 15, wherein the sensor array includes a pressure mat; and wherein the sensor data includes an image containing pixels representing pressure measurements.

17. The server of claim 16, wherein the location of the region includes a set of image coordinates.

18. The server of claim 17, wherein the set of image coordinates defines a bounding box containing a group of pixels representative of an item.

19. The server of claim 16, wherein generating the monitoring definitions includes identifying a number of pixels in each region that represent sensor noise, and setting the noise compensation indicator to the number of pixels that represent sensor noise.

20. The server of claim 16, wherein generating the monitoring definitions includes determining a lower threshold number of pixels indicating presence of an item, and setting the item presence indicator to the lower threshold.

* * * * *